FLOAT CUTTING MECHANISM
Filed Nov. 12, 1957 7 Sheets-Sheet 1
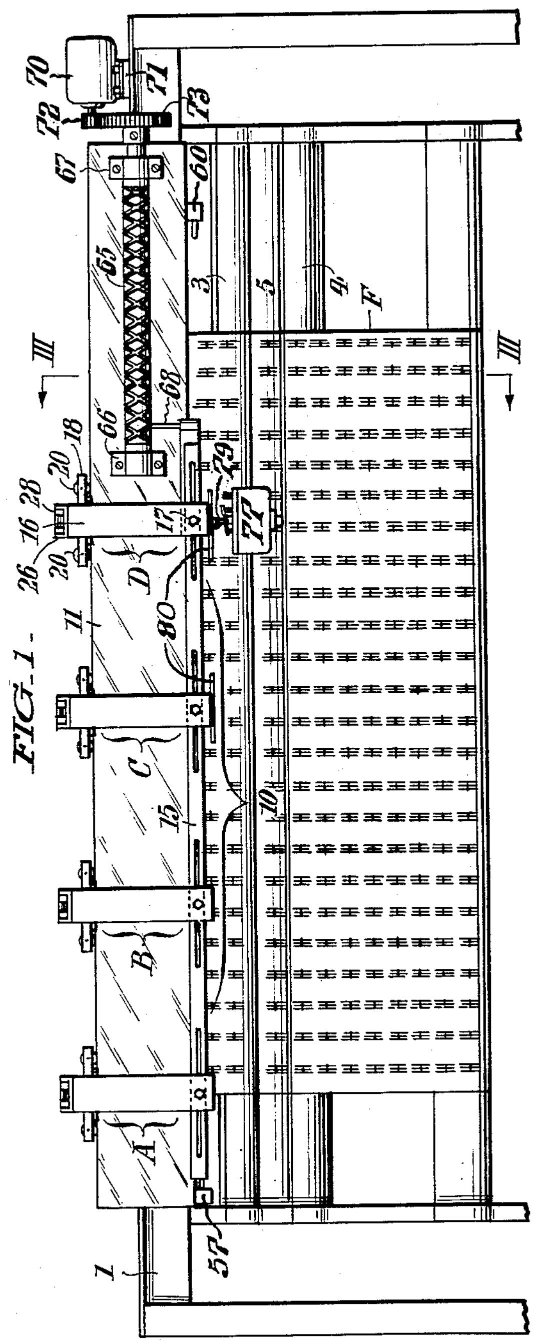
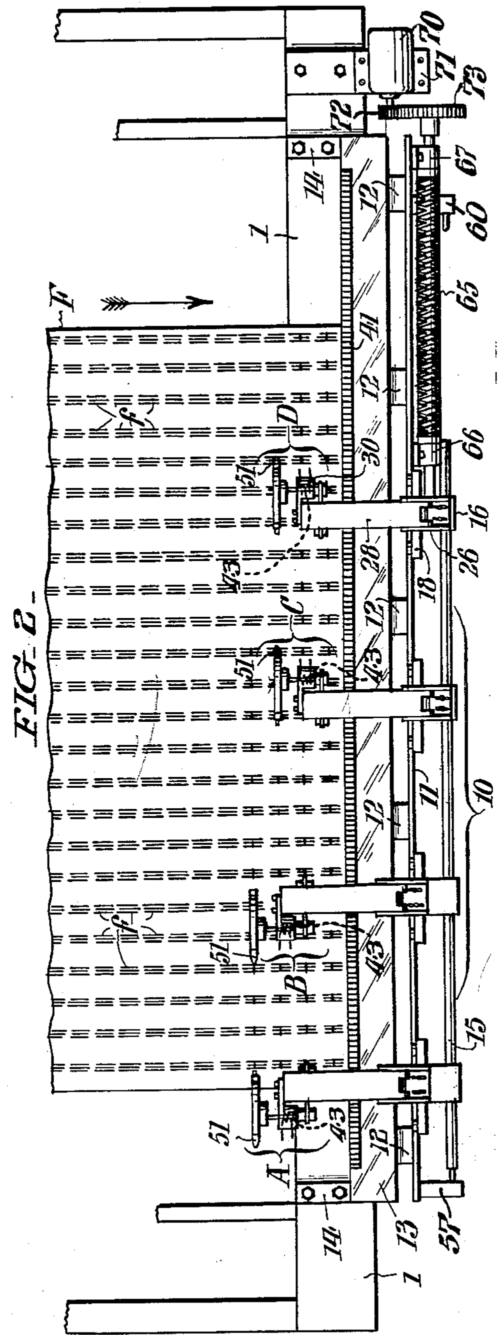
INVENTOR.
Henry T. Wright,
BY Paul & Paul
ATTORNEYS.

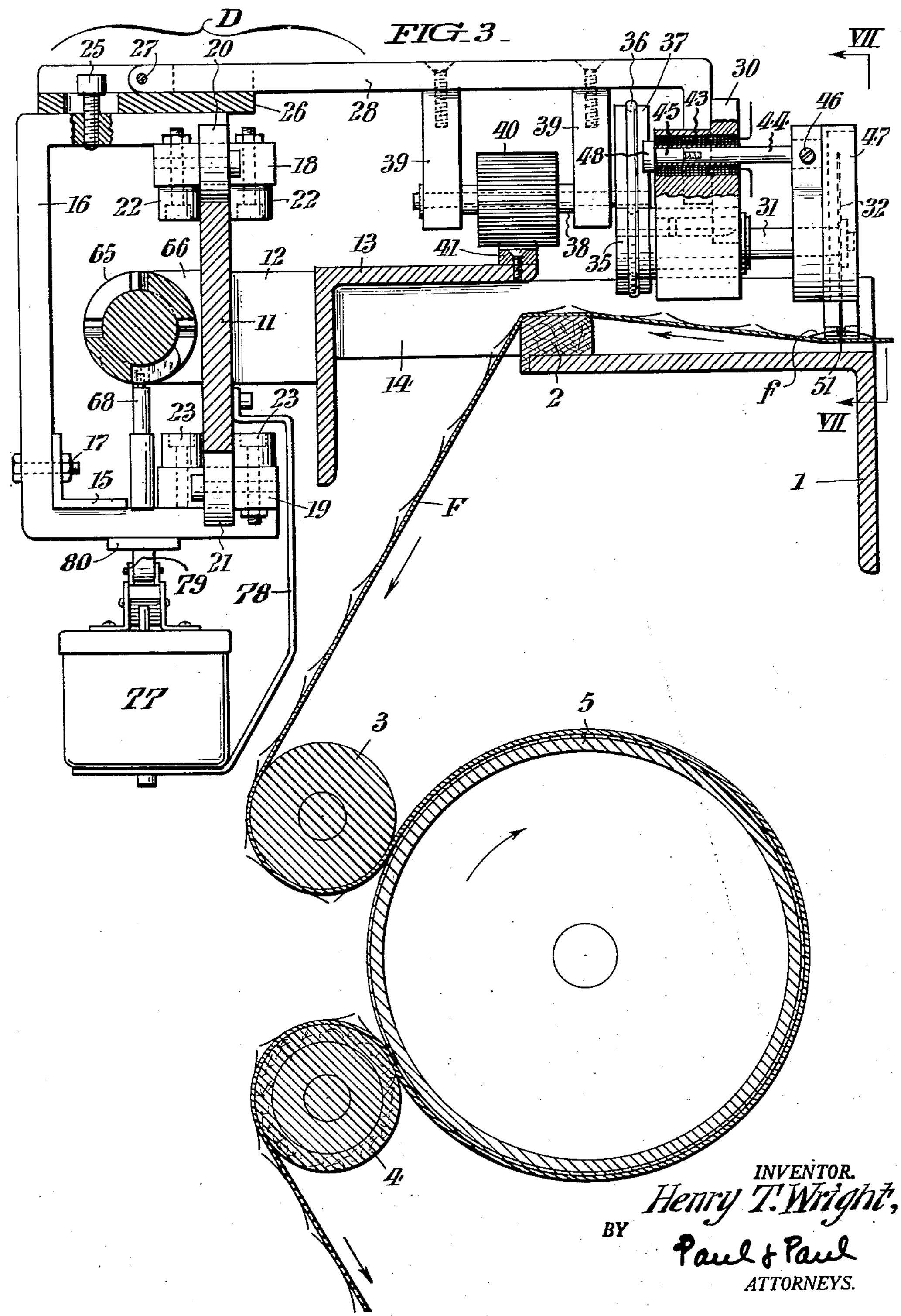
INVENTOR.
Henry T. Wright,
BY Paul & Paul
ATTORNEYS.

FLOAT CUTTING MECHANISM

Filed Nov. 12, 1957 7 Sheets-Sheet 3

INVENTOR.
Henry T. Wright,
BY Paul & Paul
ATTORNEYS.

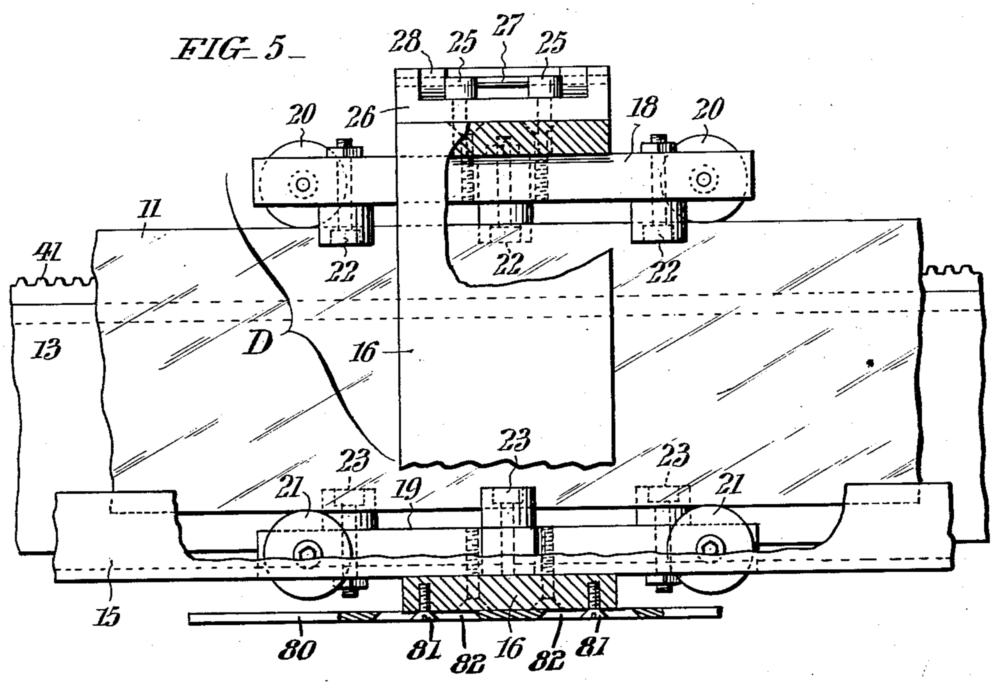
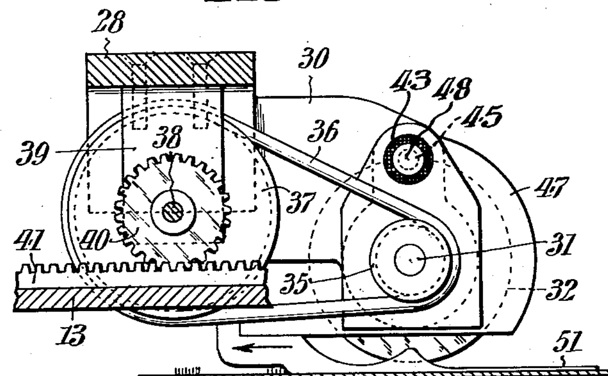
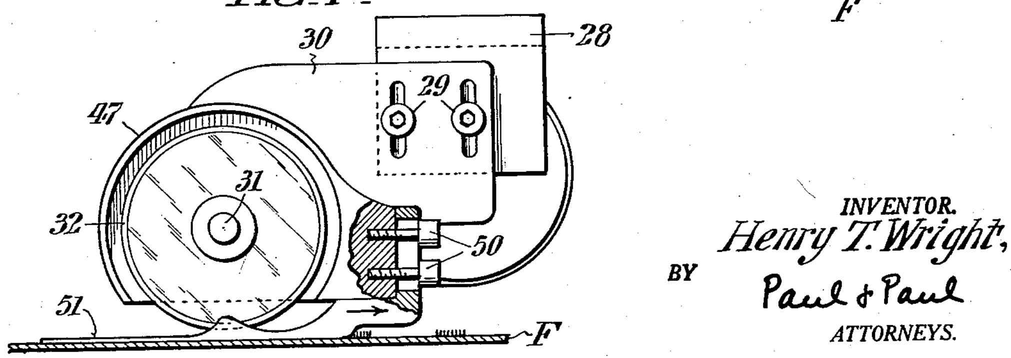
INVENTOR.
Henry T. Wright,
BY
Paul & Paul
ATTORNEYS.

Dec. 27, 1960 H. T. WRIGHT 2,966,174
FLOAT CUTTING MECHANISM
Filed Nov. 12, 1957 7 Sheets-Sheet 5
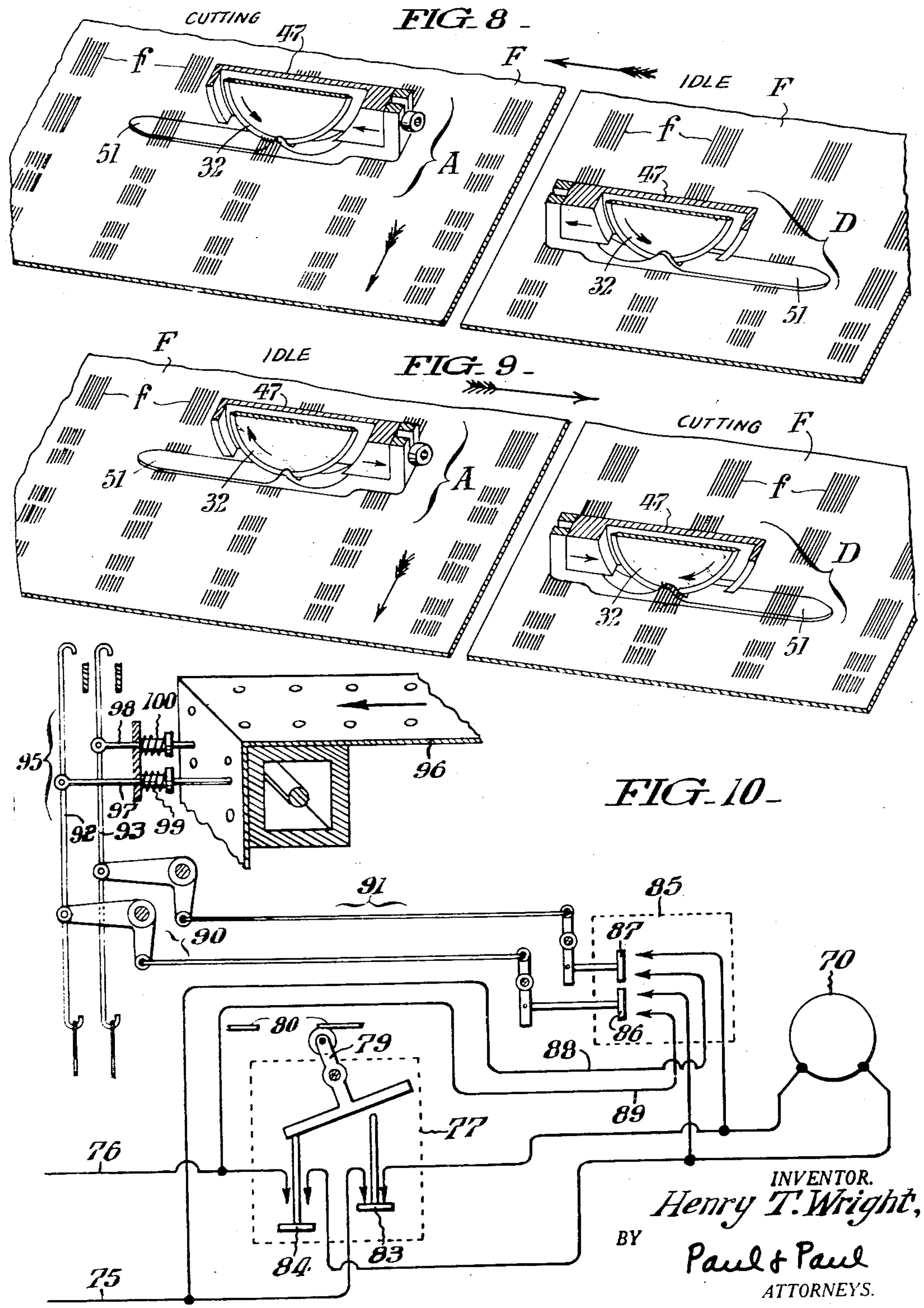
INVENTOR.
Henry T. Wright,
BY
Paul & Paul
ATTORNEYS.

FLOAT CUTTING MECHANISM
Filed Nov. 12, 1957 7 Sheets-Sheet 6
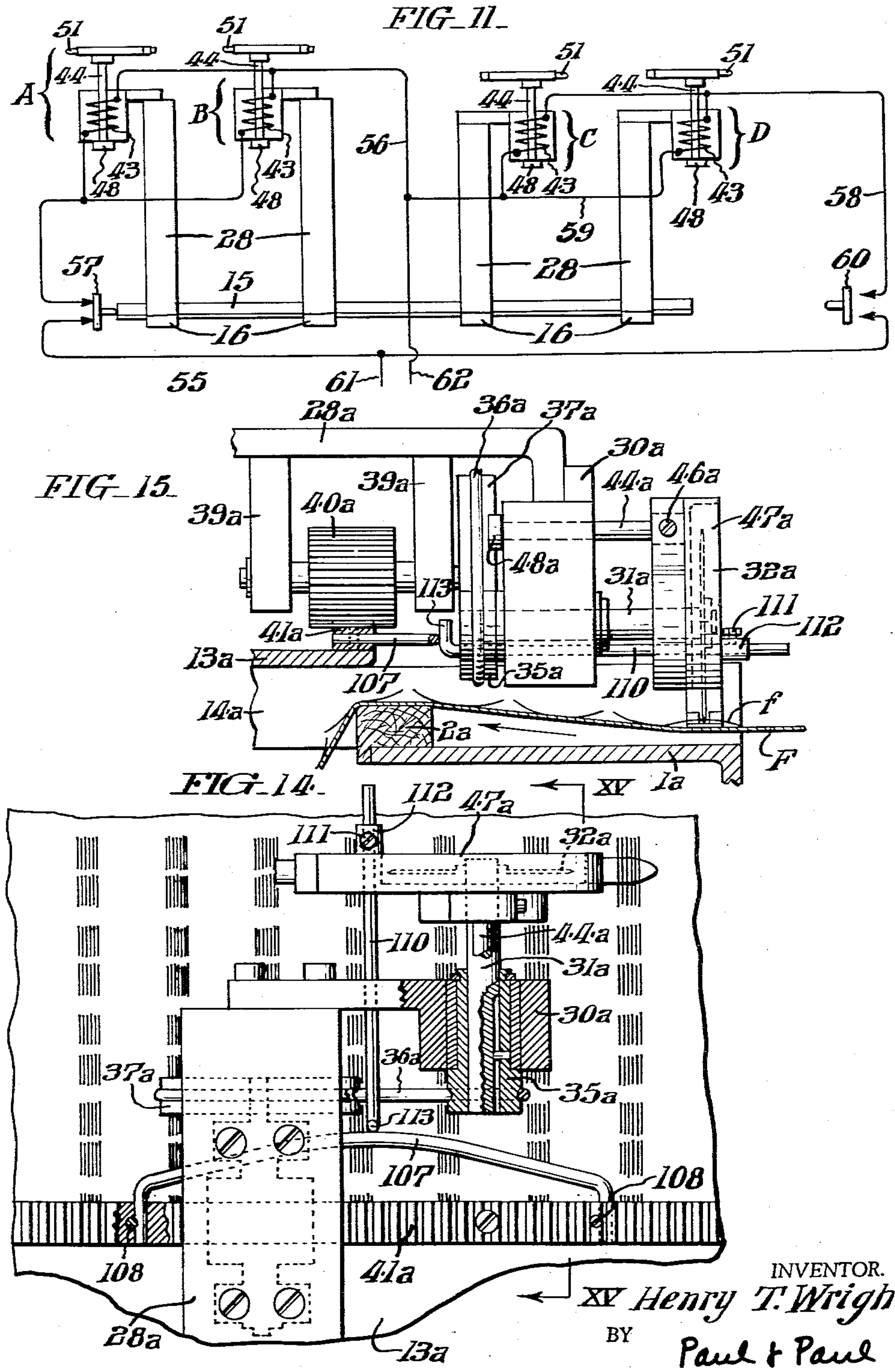
INVENTOR.
Henry T. Wright,
BY Paul & Paul
ATTORNEYS.

FLOAT CUTTING MECHANISM
Filed Nov. 12, 1957 7 Sheets-Sheet 7
FIG-12-
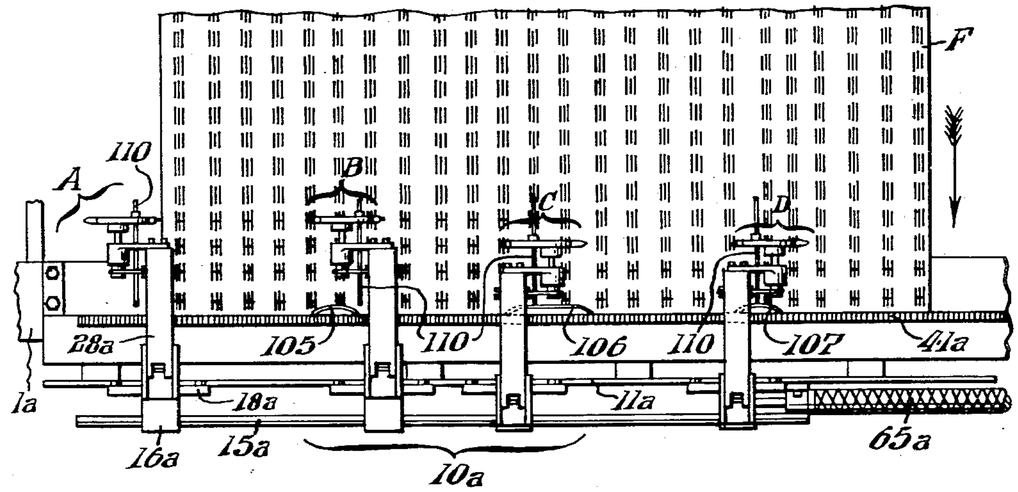
FIG-13-
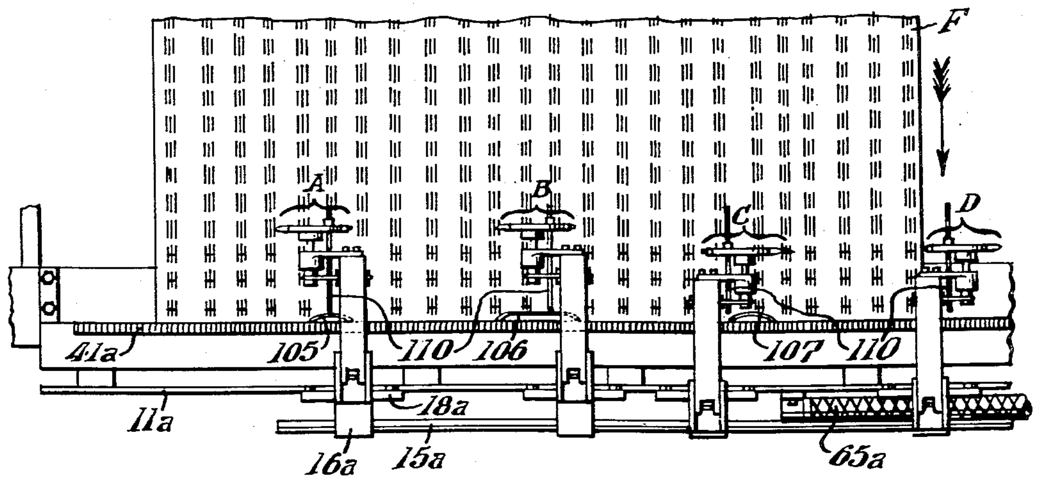
INVENTOR.
Henry T. Wright,
BY Paul & Paul
ATTORNEYS.

United States Patent Office 2,966,174 Patented Dec. 27, 1960

2,966,174

FLOAT CUTTING MECHANISM

Henry T. Wright, Gaffney, S.C., assignor to Derry Damask Mills, Inc., Gaffney, S.C., a corporation of South Carolina Filed Nov. 12, 1957, Ser. No. 695,980

11 Claims. (Cl. 139—291)

This invention relates to float cutting mechanism, that is to say, to mechanism useful in severing floats of ornamenting yarns in spaced crosswise rows of textile fabric to form pile from said floats. More particularly, this invention relates to the manufacture of tufted fabrics, such as hobnail bedspreads and the like.

The chief aim of my invention is to provide a simple and reliable mechanism capable of accomplishing the above purpose while the fabric is being longitudinally progressed on any machine, or while it is being woven in the loom.

In connection with such an apparatus wherein the cutting is accomplished by cutting elements which are periodically traversed first in one direction and then in the other in a path transversely of the fabric and supported with capacity to move bodily with the fabric during the cutting, I aim to provide improved means for automatically restoring the devices to starting position at the completion of each traverse.

Another object of my invention is to provide improved drive means for traversing the cutting elements as well as improved means for controlling the drive means to effect the intermittent traverses of said elements in timed relation to the rate of advance of the fabric.

Other objects and attendant advantages will appear from the following detailed description of the attached drawings, wherein:

Fig. 1 is a fragmentary view showing the front end of a loom equipped with cutting mechanism conveniently embodying my invention.

Fig. 2 is a fragmentary view showing the organization of Fig. 1 in top plan.

Fig. 3 is a transverse section taken as indicated by the angled arrows III—III in Fig. 1 drawn to a larger scale.

Fig. 5 is a fragmentary view looking as indicated by the angled arrows V—V in Fig. 4 with parts broken out and shown in section for exposure of important details of construction which otherwise would be hidden.

Fig. 6 is a fragmentary view in section taken as indicated by the angled arrows VI—VI in Fig. 4.

Fig. 7 is a view looking as indicated by the angled arrows VII—VII in Fig. 3 likewise with portions in section to expose important construction details.

Figs. 8 and 9 are detailed views in perspective showing the manner in which the loop cutting is accomplished by the mechanism.

Fig. 10 is a diagrammatic view of the means provided for controlling the operation of the mechanism.

Fig. 11 is a diagrammatic view showing a supplemental electric control means embodied in the mechanism.

Figs. 12 and 13 are views corresponding to Fig. 2 showing a modified embodiment of my invention.

Fig. 14 is a fragmentary view in top plan on a larger scale showing various details of the modified embodiment to better advantage; and Fig. 15 is a fragmentary view in cross section taken as indicated by the angled arrows XV—XV in Fig. 14.

Figure 4:
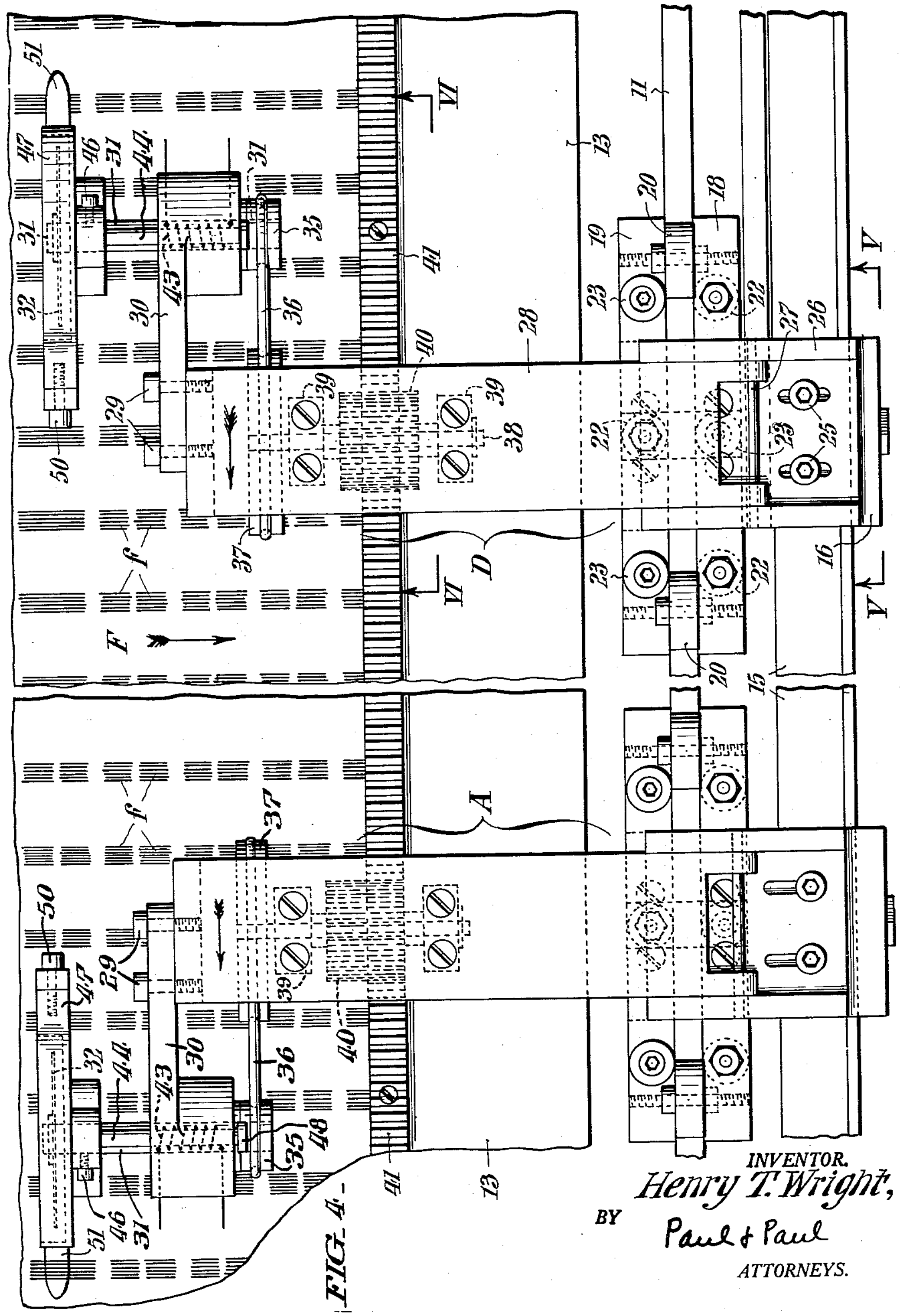
Fig. 4 is a fragmentary broken out view in top plan likewise drawn to a larger scale to better show portions of the mechanism.

With more specific reference first to Figs. 1–4 of these illustrations, the numeral 1 designates the breast beam of the loom, said beam being provided with an edge strip 2 (Fig. 3) of wood or other non-metallic material over which the fabric F is directed downwardly to a pinch roll 3 which together, with a second pinch roll 4, cooperates with a larger draw-off roll 5 in taking up the fabric F as it is produced in the loom. For the purpose of ornamentation spaced groups of special warp yarns at intervals crosswise of the fabric are interlaced with the fabric at recurrent intervals longitudinally and skipped in between with resultant formation of crosswise rows of floats *f*.

The improved mechanism which I have devised to cut the floats *f* of the fabric into pile ends comprises a carriage which is comprehensively designated 10 and which is constrained to move back and forth along a guide rail 11 fixedly supported by spaced brackets 12 from an angle bar 13 extending crosswise of the loom somewhat rearwardly of the breast beam 1, said angle bar being in turn supported at opposite ends from the breast beam by brackets 14. Sustained in spaced relation by an angle bar 15 of the carriage 10 are four cutting units A, B, C and D. Except as hereinafter pointed out, these cutting units are identical in construction, and the detailed description immediately following of the unit D will therefore be considered to hold for all of the others.

As shown in Figs. 3–5, the cutting unit D comprises a yoke-like bracket 16 which is secured, with capacity for adjustment, along the bar 15 by a clamp bolt 17. The upper and lower extremities of the bracket 16 respectively over- and under-reach the guide rail 11, and to them are secured respectively at the distal ends, cross pieces 18 and 19 which afford bearings for rolls 20 and 21 to run in contact with the top and bottom edges of the guide rail, and rolls 22 and 23 to run in engagement with the opposite sides of said rail. Affixed with capacity for in and out adjustment to the top of the yoke like bracket 16, by cap screws 25, is a plate 26 whereto is pivoted, at 27, an inwardly-reaching arm 28. To the distal end of the arm 28 is affixed by a pair of headed clamp screws 29 (Fig. 7) a laterally extending bracket 30 which provides a bearing for a shaft 31, said shaft being free to shift axially to a limited extent in said bearing, and to the outer end of it is affixed a sharp edge cutting disk 32. By virtue of being slotted (see Fig. 7) for passage through it of the shanks of the screws 29, the bracket 30 is vertically adjustable so that the disk 32 can be raised or lowered relative to the face of the underpassing fabric F. A small grooved wheel 35 at the inner end of the shaft 31 is connected by a belt 36 with a larger sheave 37 at one end of a parallel shaft 38 rotatively supported in spaced pendent bearing lugs 39 on the arm 28. A spur pinion 40 on the shaft 38 meshes with a toothed rack 41 screwed to and extending longitudinally of the top of the bar 13. Endwise slidable within a bushed solenoid coil 43 lodged in an horizontal bore in the top of the bearing portion of the bracket 30 is a short rod 44, of non magnetic metal such as brass, having a prolongation 45 of ferrous metal to function as an armature for said coil. To the outer end of the rod 44 is fastened by a screw 46 (Fig. 3) a guard 47 which surrounds the greater portion of a cutting disk at the outer end of the shaft 31 and in which said shaft also has bearing. The extent to which the rod 44 is shiftable outward is limited by engagement of a stop head 48 on the prolongation 45 with the inner face of the bracket 30. In turn secured to the guard 47 with capacity for independent up and down adjustment by means of a pair of cap screws as instanced at 50 in Fig. 7, is a flat tongue 51 which underreaches the cutting disk 32 and which extends forwardly to a considerable distance beyond said disk. As later on explained the tongue 51 is adapted to slide transversely over the fabric F and engage beneath floats *f* of the fabric. The front end of the tongue 51 is rounded to facilitate its entry beneath the floats *f* and, at opposite sides of the cutting disk 32, said tongue has bumps for lifting the floats into engagement with the cutting edge of the disk.

As shown in the diagram of Fig. 11 the solenoid coils 43 of units A and B are connected in parallel in a circuit 55, 56 in which a limit switch 57 is interposed, and the solenoid coils 43 of the units C and D are connected in parallel in a separate circuit 58, 59 in which a limit switch 60 is interposed, electric current being supplied to said circuits under control of said switches, as hereinafter more fully explained, through conductors 61 and 62. By reference to Figs. 1 and 2 it will be observed that the limit switches 57 and 60 are affixed to the rail 11 adjacent opposite ends thereof so as to be closed alternately upon engagement by the angle bar 15 at the completion of the traverse of the carriage 10 in opposite directions.

The means for reciprocating the carriage 10 includes a double threaded spindle 65 (Figs. 1, 2, 3) which is rotatively supported at opposite ends in bearing blocks 66 and 67 bolted to the guide bar 11 with its thread grooves engaged by a follower stud 68 (Fig. 3) upstanding from one end of the bar 15 of the bottom arm of the bracket 16. An electric motor 70, supported by a projection 71 at one end of the breast beam 1, has a pinion 72 on its shaft to drive a spur gear wheel 73 on the corresponding end of the screw spindle 65, current being supplied to the motor through the conductors shown at 75 and 76 in Fig. 10.

In order to stop the motor 70 after the carriage 10 completes its strokes in opposite directions, each time for a definite period required for interlacement of the warps and the filling threads between the crosswise rows of floats *f* in the fabric F, I have provided control means including a double acting limit switch 77 which, see Fig. 3, is suspended from the guide rail 11 by a hanger bracket 78. As shown, the switch 77 has a toggle 79 which is arranged to be actuated by trip plates 80 secured, see Figs. 1, 3 and 5, by headed screws 81 to the bottom of the yoke-like brackets 16, the shanks of said screws passing through longitudinal slots 82 in said plates which can thus be adjusted relative to the brackets. referring again to Fig. 10, the movable contacts 83 and 84 of the limit switch 77 serve to alternately interrupt current flow in the conductors 75 and 76 leading to the motor 70 as the toggle 79 is thrown in opposite directions.

To start the motor 70 after lapse of the time intervals hereinbefore referred to, I have shown in Fig. 10 means including another double acting switch 85 whereof the moving contacts 86 and 87 respectively are adapted to bridge the terminals respectively of branch conductors 88 and 89 extending from the power supply conductors 75 and 76 to the motor 70. Through motion translating linkages 90 and 91, the movable contacts 86 and 87 of the switch 85 are connected to individual hooks 92 and 93 of a Jacquard mechanism 95. The perforated card belt 96 of the Jacquard is advanced, in a manner well known to those schooled in the textile arts, for actuation of the hooks 92 and 93 through medium of the usual needles 97 and 98 which are pressed toward the card by springs 99 and 100. It is to be noted that the perforations in the card belt 96 are so arranged as to determine alternate actuation of the contacts 86 and 87 of switch 85; and it is to be understood that the Jacquard here shown in part may be that employed in controlling the shedding of the warps during weaving of the fabric.

*Operation*

As the fabric F is being produced in the loom and advanced over the breast beam 1 by action of the take-up rolls 3, 4, 5, the carriage 10 is traversed along the rail 11 first in one direction and then in the other at recurrent intervals, by virtue of being connected by the follower 68 to the reversely threaded feed screw 65 as the latter is rotated by the intermittently operated motor 70. During each traverse of the carriage 10 leftward, the tongues 51 of the units A and B enter beneath the floats *f* of a crosswise row with incidental cutting of said floats by the respectively associated disks 32, the tongues of the units C and D simply sliding idly over the surface of the fabric in this traverse of the carriage as will be readily understood from Fig. 4. During each traverse of the carriage 10 rightward, the tongues 51 of the units C and D enter beneath the floats *f* of another crosswise row with incidental cutting of said floats by the respectively associated disks 32, while the tongues 51 of the units A and B glide idly over the surface of the fabric. It is to be particularly noted that the extent of movement imparted to the carriage 10 is such that the units A and B are active as they are moved from over the mid portion of the fabric toward the left selvage; that the units C and D are active as they are moved from the mid area of the fabric to the right selvage; and, moreover, that by engagement of the tongues 51 beneath the floats during the cutting, the disks 32 of the respective units are cause to follow with the fabric by virtue of the freedom of their shafts to slide endwise in the brackets 30. Each time that the carriage 10 reaches the end of its leftward traverse; the switch 57 is closed as in Fig. 11, to establish the circuit 61, 55, 62 with attendant energization of the solenoids 43 of the units A and B whereby the corresponding disks 32 are thrust rearward, i.e. in a direction opposite to the advance of the fabric F, to starting position in readiness to function as above explained, on the next leftward traverse of the carriage. Similarly, as the carriage 10 completes each rightward stroke, the bar 15 closes the switch 60 with attendant establishment of the circuit 61, 58, 59 and energization of the solenoids 43 of the units C and D to re-set the cutting disks 32 of said units in readiness to function during the next rightward traverse of the carriage. The motor 70 is stopped as the carriage 10 reaches the end of each leftward traverse as a consequence of tripping of the toggle 79 of switch 77 as shown in Fig. 10 by the plate 80 on the bracket 16 of the unit D with resultant opening of the contact 84 and breaking of the circuit 75, 76 in which the motor is interposed. The motor 70 is next re-started upon registry of one of the apertures in the card belt 96 with the needle 97 which latter is thereupon moved rightward by its spring 99 to bring the hook 92 into position to be lifted by the grid of the Jacquard 95. When this occurs, the contact 86 of the switch 85 will be closed with consequent supply of current to the motor 70 in a manner readily understood from Fig. 10, and progression of the carriage 10 rightward. As the carriage 10 completes its rightward traverse, the toggle 79 of switch 77 is tripped in the same direction by the plate 80 on the bracket 16 of the unit C, the contact of the switch 83 being thereby opened to interrupt current flow to the motor 70. The motor will thereupon remain idle until another of the apertures in the belt 96 comes into registry with the needle 98 which will then be shifted by its spring 100 for actuation of the hook 93 of the Jacquard 95 whereby, through the linkage 91, the contact 87 of switch 85 will be closed for current supply to the motor 70 to start the carriage 10 on its next leftward traverse. Upon completion of this traverse of the carriage the toggle 79 of switch 77 will be returned to the position of Fig. 10 to open the contact 84 and interrupt current supply to the motor 70 as will also be readily understood from Fig. 10.

In the modified embodiment of the invention illustrated in Figs. 12–15, the cutting disk shaft 31*a* of each cutting unit A–D is axially slidable in the bracket 30*a* as in the first described embodiment as is also the guide rod 44*a*, so that the cutting disk 32*a* is free to move bodily with the fabric during the float cutting. In each instance, also, the guide rod 44*a* is provided with a stop head 48*a* to limit the extent to which it can be moved rearward at the completion of the traverse of the carriage 10. In lieu of solenoids to restore the disks to position for starting cuttings, I have provided, in this instance, three cam elements 105, 106, and 107 which are fashioned from stout wire, and are secured to inner side of the toothed rack 41*a*, the larger one 106 of the three to the rack substantially at the center, and the two smaller ones 105 and 107 to the rack at substantially equal distances from said longer one. As illustrated in Fig. 14, the ends of the wire of the cam element 107 are bent laterally and engaged in lateral apertures in the rack, and are made fast by set screws 108. It is to be understood that the cam elements 105 and 106 are secured to the rack 41*a* in a like manner. For cooperation with the cam elements each unit A–D has associated with it a rod 110 which, as exemplified in Figs. 14 and 15, is adjustably secured by a set screw 111 in a boss 112 on the guard 47*a* that partly surrounds the cutting disk 32*a*, the frontal end of said rod being turned up as at 113 in Fig. 15 to engage with the cam elements.

With the modified arrangement it will be seen from Fig. 12 that, as the carriage completes each leftward traverse, the rods 110 of the units C and D are engaged by the cam elements 106 and 107 and the corresponding cutting disks are moved to start position in a direction opposite to the advance of the fabric F in readiness to cut the floats *f* during the succeeding rightward traverse of the carriage. On the other hand, it will be seen from Fig. 13 that as the carriage completes each rightward traverse, the rods 110 of the units A and B are engaged by the cam elements 105 and 106 and the corresponding cutting disks are moved to start position in opposition to the advance of the fabric F to cut the floats *f* during the succeeding leftward traverse of the carriage. In all other respects the construction and operation of the modified apparatus is identical with that of the first described embodiment. Therefore, in order to dispense with the necessity for duplicate description, all other elements of the modified construction not particularly referred to but having their counterparts in the first embodiment, have been identified with the same reference numerals previously employed with addition however, in each instance, of the letter "*a*" for convenience of more ready distinction.

While I have herein described the float cutting mechanism in association with a loom, obviously, it can be used to effect such cutting after the fabric has been produced and taken from the loom, simply by providing a support (corresponding to the breast beam of a loom) and a means (corresponding to take up 3, 4, 5 of the loom) for advancing the fabric over such support.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. Mechanism for cutting floats of ornamenting warps in spaced rows extending crosswise of longitudinally advancing textile fabric, said mechanism comprising at least two cutting units each having a rotary cutting disk, one of said cutting disks being operable during traverse of the units in a path crosswise of the fabric in a predetermined direction and another of said cutting disks being operable in the opposite direction in said path, each of said rotary cutting disks being freely movable along its axis of rotation; drive means for alternately traversing the units crosswise of the moving fabric edge for cutting movement outward toward a side edge of the fabric whereby during traverse in one direction, the floats are cut by one of the units but not by the other, and whereby upon traverse in the opposite direction the floats are cut only by the other of said units, and means stationed along the path of traverse of said units free of attachment thereto and positioned to cause the disks to be axially shifted reversely and thereby re-positioned near the beginning of their cutting strokes.

2. The invention according to claim 1, wherein the respective cutting elements are traversed outwardly respectively from the mid area of the fabric.

3. The invention according to claim 1, wherein the cutting units are mounted on a carriage constrained to a transverse guideway; and wherein the means causing the disks to be reversely shifted comprises individually-associated magnet devices, and switches respectively in circuit with said devices, adapted to be closed respectively by the carriage as it completes its traverses in opposite directions.

4. The invention according to claim 1, wherein the cutting units are mounted on a carriage constrained to a transverse guide rail; and wherein the means for reversely shifting the cutting disks comprises stationary cams positioned to engage said units as the carriage completes its traverses in opposite directions.

5. The invention according to claim 1, wherein the cutting units are mounted on a carriage constrained to a transverse guideway; and wherein the traversing means includes a double threaded spindle, a follower on the carriage in engagement with the spindle, and an intermittently operated electric motor for driving the motor.

6. The invention according to claim 1, wherein the cutting units are mounted on a carriage constrained to a transverse guideway; and wherein the traversing means includes a double threaded spindle, a follower on the carriage in engagement with the spindle, an electric motor for driving the spindle; and further including intermittently actuated timing means for controlling supply of current to the motor; and means for interrupting the supply of current to the motor as the carriage completes its traverse in each direction.

7. The combination with a loom having a Jacquard for weaving fabric having spaced crosswise rows of floats formed from ornamenting yarns, a breast beam and a take up for advancing the fabric over the breast beam, of mechanism comprising a carriage supported from the breast beam; a plurality of cutting units on the carriage each having a rotary cutting disk with an associated underlying tongue for engaging beneath the floats and lifting them into the cutting range of the disks, each such disk being freely movable along its axis of rotation; means for traversing the carriage intermittently in opposite directions to move the cutting units in a path crosswise of the fabric including an electric motor; timing means controlled from the Jacquard for controlling supply of current to the motor; means actuated by the carriage after it completes its traverses in opposite directions to interrupt current flow to the motor; and means stationed along the traverse path of said units, free of attachment to said disks and positioned to cause the disks to be axially shifted reversely and thereby re-positioned near the beginning of their cutting strokes.

8. The invention according to claim 7, wherein the means for traversing the carriage includes a double threaded spindle driven by the motor, and a follower on the carriage engaged with the spindle.

9. The invention according to claim 7, wherein the means for reversely shifting the cutting disks comprises individually-associated magnet devices, and switches respectively in circuit with said devices adapted to be temporarily closed by the carriage as it completes its traverses in opposite directions.

10. The invention according to claim 7, wherein the means for reversely shifting the cutting units comprises stationary cams positioned to engage said disks as the carriage completes its traverses in opposite directions.

11. Mechanism for cutting floats of ornamenting warps in spaced rows extending crosswise of longitudinally advancing textile fabric, said mechanism comprising a cutting unit having a rotary cutting disk with an associated underlying tongue for engaging beneath the floats and lifting them into the cutting range of the disk during traverse of said unit in one direction in a path crosswise of the fabric, said disk being freely movable along its axis of rotation whereby it is free to drift with the longitudinal movement of the fabric while it cuts said floats; drive means for alternately traversing the unit crosswise of the moving fabric; and means stationed along the path of the unit, free of attachment to said unit and instrumental in causing the disk to be axially shifted reversely after completing its cutting operation and thereby repositioned for beginning its next cutting stroke.

References Cited in the file of this patent

UNITED STATES PATENTS

| | | |
|---|---|---|
| 2,651,080 | Wied | Sept. 8, 1953 |
| 2,664,920 | Riddle | Jan. 5, 1954 |
| 2,685,309 | Schaller | Aug. 3, 1954 |